(12) United States Patent
Hisada (10) Patent No.: US 8,564,974 B2
(45) Date of Patent: Oct. 22, 2013

(54) SWITCHING POWER SOURCE APPARATUS (75) Inventor: Shigeru Hisada, Saitama (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 601 days.

(21) Appl. No.: 12/523,636

(22) PCT Filed: Jan. 16, 2008

(86) PCT No.: PCT/JP2008/050384
§ 371 (c)(1),
(2), (4) Date: Nov. 19, 2009

(87) PCT Pub. No.: WO2008/087951
PCT Pub. Date: Jul. 24, 2008

(65) Prior Publication Data
US 2010/0085779 A1    Apr. 8, 2010

(30) Foreign Application Priority Data
Jan. 19, 2007   (JP) .................................. 2007-010125

(51) Int. Cl.
*H02M 3/337* (2006.01)

(52) U.S. Cl.
USPC ........................... 363/19; 363/21.16; 323/235

(58) Field of Classification Search
USPC .......... 363/21.16, 21.12, 21.13, 21.15, 21.18, 363/21.02, 21.03, 21.08, 19; 323/235
See application file for complete search history.

(56) References Cited

U.S. PATENT DOCUMENTS

| 4,984,145 | A | * | 1/1991 | Dangschat et al. | ............. 363/19 |
| 6,078,510 | A | * | 6/2000 | Spampinato et al. | ........ 363/21.13 |
| 8,339,813 | B2 | * | 12/2012 | Wang et al. | ................ 363/21.02 |
| 2003/0048645 | A1 | | 3/2003 | Hosotani et al. | |

FOREIGN PATENT DOCUMENTS

| CN | 1434562 A | 8/2003 |
| GB | 2388258 A | 11/2003 |
| JP | 09-205771 A | 8/1997 |
| JP | 2002-374672 A | 12/2002 |
| JP | 2003-224972 A1 | 8/2003 |

OTHER PUBLICATIONS

International Search Report of Application No. PCT/JP2008/050384 mailed on Mar. 4, 2008.

* cited by examiner

*Primary Examiner* — Harry Behm (57)   ABSTRACT

In a switching power source of a flyback converter system according to the present invention, large electric power can be applied, by reducing loss of a switching element, a coil, and an output smoothing circuit, input voltage is applied to a primary coil of a transformer, and switching drive of the input voltage is carried out by a switching element, so that direct-current electric power is outputted from a secondary coil of the transformer through a rectifier circuit. The power source apparatus includes a trigger-control circuit which detects direct-current output voltage to control an "on" period, detects that current of the secondary coil becomes zero based on a voltage signal from a control coil, and turns on the switching element, and a timer circuit which is operated according to the voltage signal of the control coil, and gives an ON signal to the trigger-control circuit according to a timing signal.

2 Claims, 6 Drawing Sheets

SWITCHING POWER SOURCE APPARATUS

TECHNICAL FIELD

The present invention relates to a control circuit and a control method capable of miniaturizing a switching power source and making an output thereof high.

BACKGROUND

Figure 5:
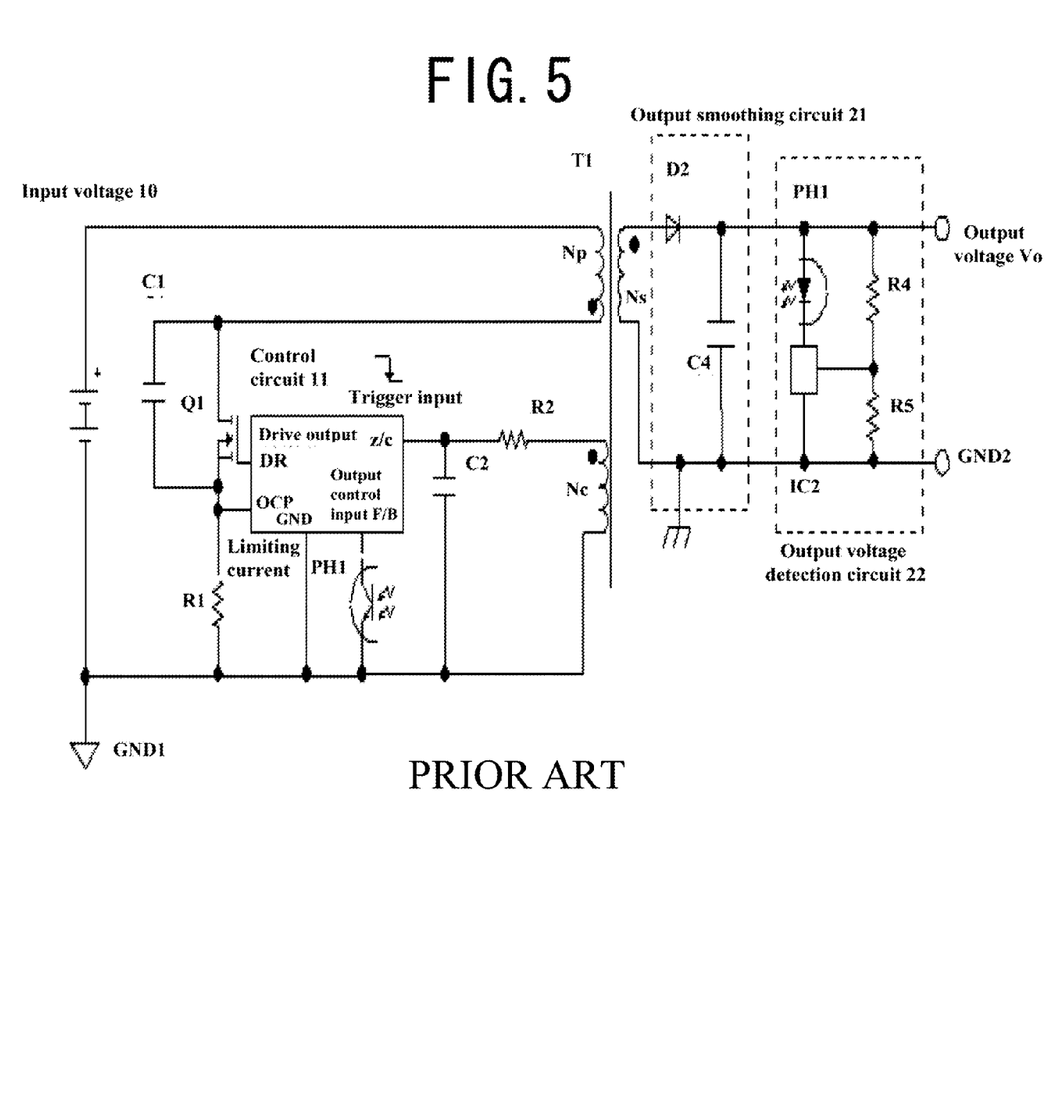
FIG. 5 is an example of a conventional circuit diagram of a switching power source according to the present invention.

An example of a conventional flyback converter type switching power source is shown in FIG. 5. In the switching power source, when current flowing through a secondary coil Ns of a transformer T1 becomes zero, a voltage reversal at a control coil Nc of the transformer T1 is detected, whereby frequency variable control which turns on a main switch Q1 is performed.

Furthermore, when the current of the secondary coil Ns of the transformer T1 becomes zero, the voltage reversal of the control coil Nc of the transformer T1 is detected, and using resonance caused by a primary coil Np of the transformer T1 and a capacitor which are connected in series with or in parallel to each other, control is performed in order to realize reduction of switching loss and low noise thereof by performing delay adjustment of on-timing of the main switch Q1, that is, the so-called soft switching operation is performed (refer to Laid Open Patent No. H09-205771).

Moreover, in such a flyback converter system for a switching power source, an oscillation frequency thereof is fixed, and a PWM control, which is based on an on-off ratio, is performed, in which a miniaturization of a transformer is realized by operating it with a switching current waveform which is a trapezoid current waveform.

SUMMARY

However, in such a frequency variable control of a flyback converter system, switching current is a triangular current waveform, so that a peak value thereof and an effective value thereof become high, whereby loss in a main switch, a coil, and an output smoothing circuit is large, so that it is not suitable for a power supply whose power is large.

Moreover, in a PWM control of a flyback converter system, since it is possible to operate it with a switching current waveform which is a trapezoid current waveform, a peak value thereof and an effective value thereof can be reduced, and a main switch, a coil, and an output smoothing circuit can be miniaturized. On the other hand, since an oscillation frequency is fixed, so that a discharge noise in specific frequency is large, and in addition, since it is difficult to perform a soft switching in which resonance is used, an increase in switching loss such as rapidly increasing current due to electric discharge of a damper capacitor or short-circuit current due to recovery current of a secondary rectifier diode, and a generation of a high frequency noise due to rapid switching become a problem.

In view of the above-mentioned problems, the present invention is to offer a flyback converter type switching power source to which a large electric power can be supplied, by reducing loss in a switching element, a coil, and an output smoothing circuit.

In the power source apparatus according to the present invention, input voltage is applied to a primary coil of a transformer, and switching drive of the input voltage is carried out by a switching element, so that direct-current electric power is outputted from a secondary coil of the transformer through a rectifier circuit, and the present source apparatus comprises a trigger-control circuit which detects direct-current output voltage so as to control an "on" period, which detects that current of the secondary coil becomes zero based on a voltage signal from a control coil that the transformer has, and which turns on the switching element; and a timer circuit which is operated according to the voltage signal of the control coil for timing, and which gives an ON signal to the trigger-control circuit according to a timing signal obtained by timing so as to perform control.

Further, in a capacitor for timing, which forms the timer circuit, the capacitor is charged to negative by a negative voltage level which is proportional to the input voltage generated in the "on" period of the switching element according to the voltage signal from the control coil, and the capacitor for timing is charged to positive according to positive voltage level proportional to the output voltage generated in the control coil in a "off" period, whereby one cycle is timed by calculation of the "on" period and the "off" period of the control coil voltage, so as to control oscillation cycle.

The timing signal obtained by timing of the timer circuit and a zero detection signal which detects that the current of the secondary coil becomes zero are made exclusive, and an earlier one of the timing signal and the zero detection signal has priority over the other as an on signal.

According to the present invention, by reducing a loss of a switching element, a coil, and an output smoothing circuit, which is a drawback in the frequency variable control of the conventional flyback converter type switching power source, it is possible to offer, at low cost, a flyback converter type switching power source to which large electric power can be applied.

Moreover, it becomes possible to reduce the discharge noise in a specific frequency which is a drawback of the PWM control of the conventional flyback converter type switching power source, and furthermore, it also becomes possible to perform soft switching in which resonance is used. Moreover, an increase in switching loss, such as rapidly increasing current due to electric discharge of a damper capacitor, or short-circuit current due to recovery current of a secondary rectifier diode etc. and a generation of the high frequency noise due to steep switching can also be reduced.

DESCRIPTION

Figure 1:
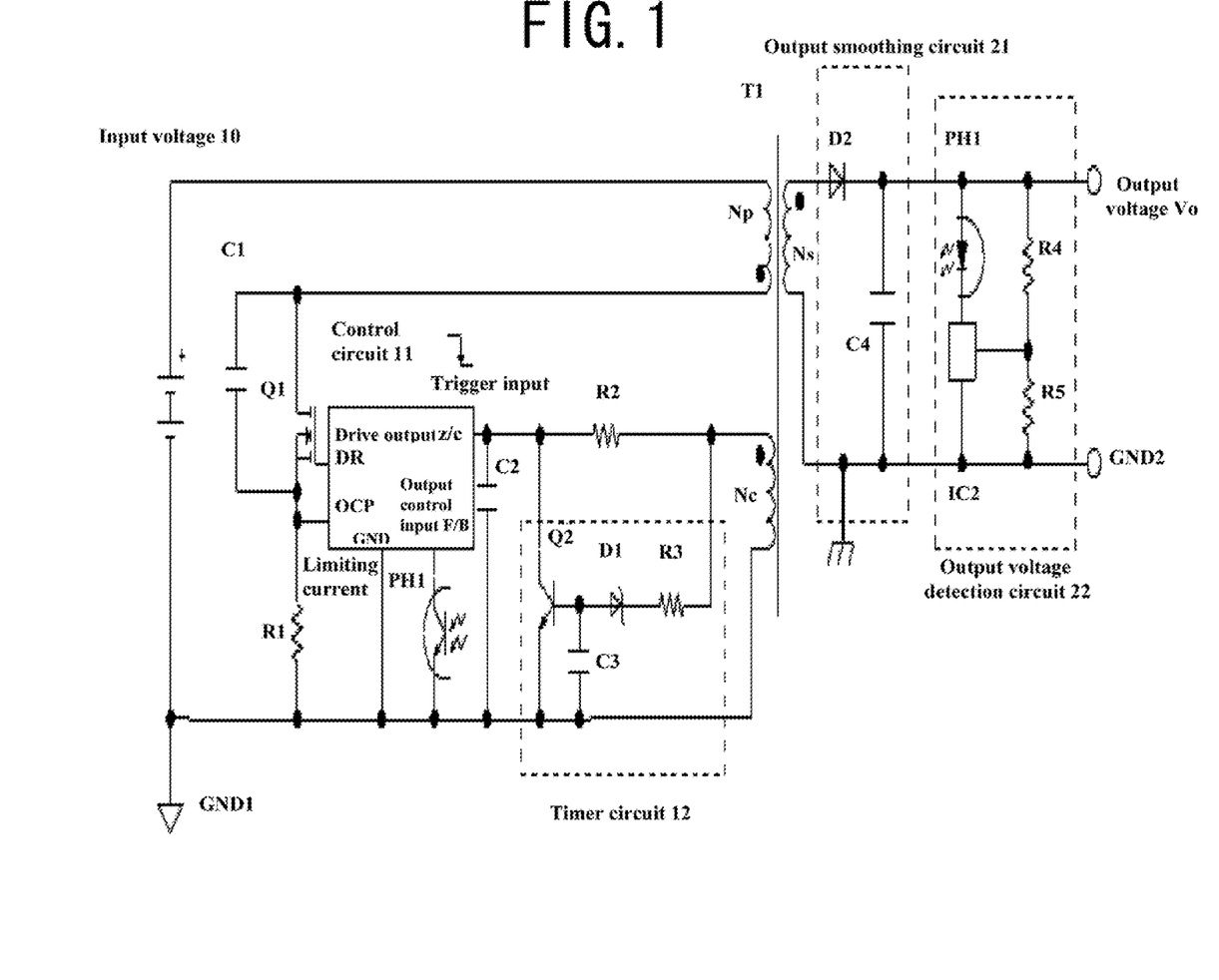
FIG. 1 is a circuit diagram showing an embodiment of a switching power source according to the present invention.
Figure 6:
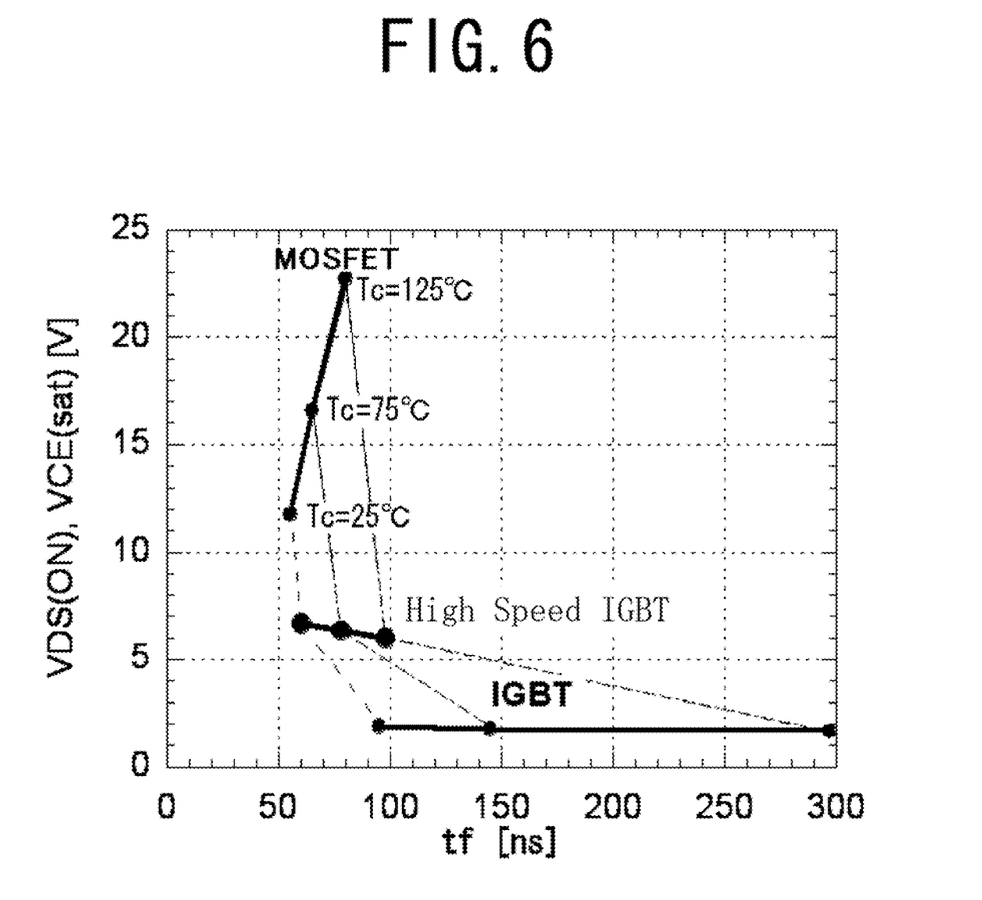
FIG. 6 shows a temperature characteristic curve in which an IGBT and a MOSFET are compared with each other.

Hereafter, description of an embodiment of a switching power source according to the present invention will be given below referring to drawings. FIG. 1 is a diagram showing a circuit applied to a switching power source according to the present invention. The switching power source according to the present enforcement has a transformer T1 with a primary-coil Np, a secondary coil Ns, and a control coil Nc. A main switch Q1 which turns on and off input voltage and input voltage is connected to the primary coil Np of the transformer T1. A current detection resistor R1 is in series connected with the main switch Q1. A damper capacitor C1 is connected in parallel with the main switch Q1. In addition, in this embodiment, although the main switch Q1 is formed from a MOSFET, the main switch Q1 may be formed from a high speed IGBT. For example, in a vertical MOS transistor in which a drain electrode disclosed in Japanese Laid Open Patent No. 61-150280 is formed as a Schottky junction instead of N+ or P+, saturated voltage (VCE(sat)) is kept low, and the vertical MOS transistor is capable of a high speed operation and does not depend on a temperature. Therefore, since in such a vertical MOS transistor, a thermal run away rarely occurs as compared with a general MOSFET formed by Ohmic contact, it is suitable to use such a transistor for a power supply according to the present invention in which a peak load power is required (FIG. 6 VCE(sat)-tf temperature characteristic: a comparative example). Therefore, it is optimal to select a way of uses of a switching element according to intended purposes of such a power supply.

A smoothing circuit 21 based on a flyback output is connected to the secondary coil Ns. Specifically, the anode of a rectifier diode D2 is connected to one end of the secondary coil Ns of the transformer T1, and the cathode of the rectifier diode D2 is connected to a smoothing capacitor C4.

An output voltage detector 22 which detects voltage is connected to terminals for an output which is smoothed by the smoothing circuit 21. The output voltage detector 22 has a photo coupler PH1. A signal detected by the output voltage detector 22 is inputted from the photo coupler PH1 into an ON period control input F/B of a control circuit 11 through a photo transistor PH 1 provided in the primary side thereof ("the photo coupler PH1" and "the photo transistor PH 1" are hereafter collectively referred to as "a photo coupler PH 1").

The control coil Nc of the transformer T1 is connected with a trigger input Z/C of the control circuit 11 through an on-timing adjusting resistor R2. A drive output DR of the control circuit 11 is connected with the gate of the main switch Q1. Moreover, the control coil Nc of the transformer T1 is connected with a timer circuit 12.

The timer circuit 12 in this embodiment is formed as described below. One end of the control coil Nc of the transformer T1 is connected with a resistor R3 for timing setup, and is connected with a base terminal of a switch Q2 through the resistor R3 for timing setting and a constant voltage diode D1. A capacitor C3 is in parallel connected with the base terminal and an emitter terminal of a switch Q2, and the collector terminal of the switch Q2 is connected to the trigger input Z/C terminal of the control circuit 11. One end of the capacitor C3 is connected with the other end of the control coil Nc. In addition, an output of the control coil Nc of the transformer T1 is wound around the output coil Ns in the same phase.

When the control circuit 11 receives a trigger signal changing from "Hi" to "Lo" at the trigger input Z/C terminal thereof, an ON signal is outputted to the gate of the main switch Q1 from a drive output DR, so that the main switch Q1 is turned on. Moreover, an "on" period of the main switch Q1 is controlled by controlling the ON period control input F/B by a signal from the photo coupler PH 1.

Figure 2:
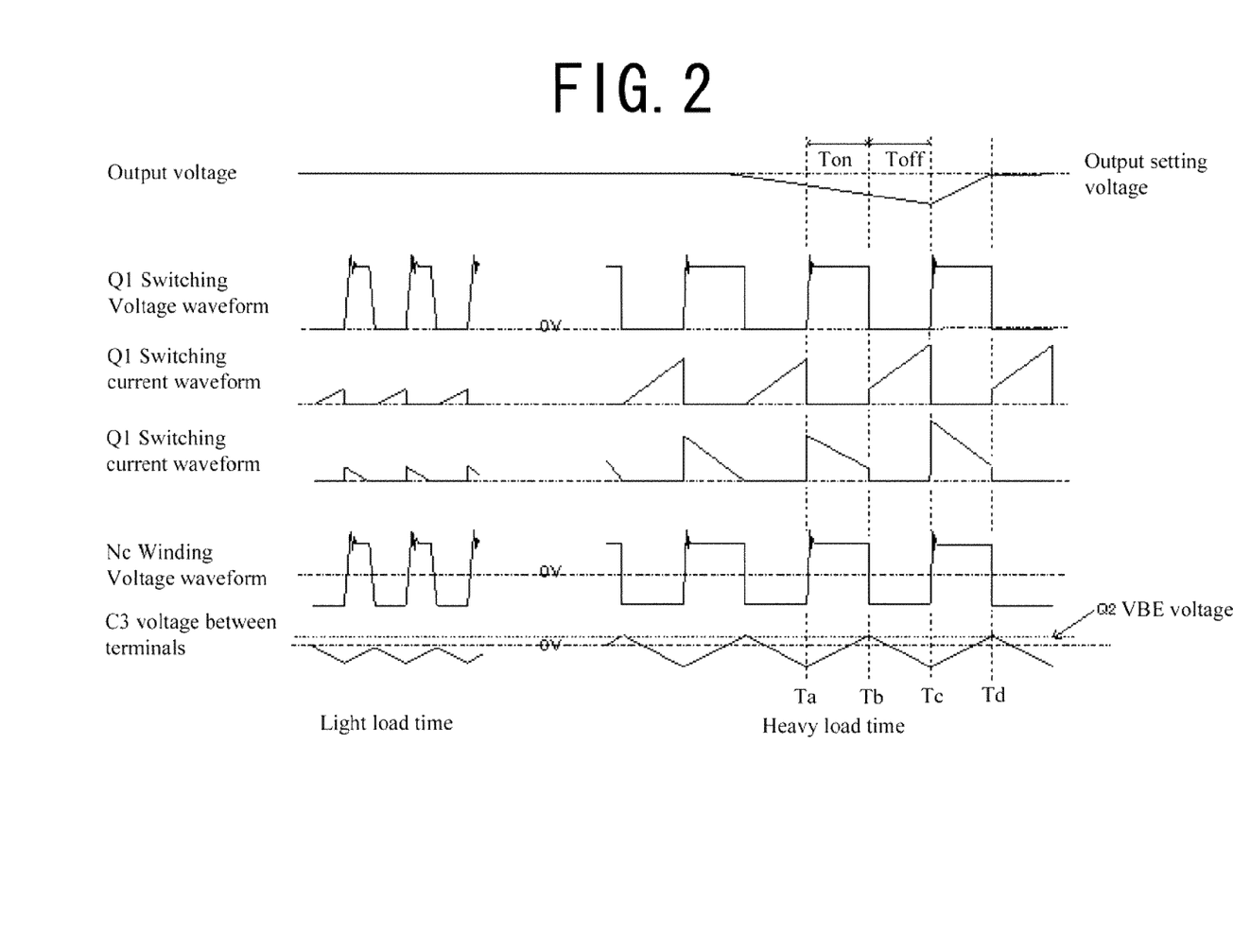
FIG. 2 shows an operation waveform of the circuit according to the embodiment shown in FIG. 1.

The switching power source according to the present invention functions as described below. In addition, FIG. 2 shows a timing chart of waveforms in an operation of the switching power source according to the present invention. Since the switching power source shown in this embodiment is based on circuit in which a flyback converter type frequency variable control is performed, when the main switch Q1 is turned on, electromagnetic energy is stored in the primary coil of the transformer T1. When the time set up by the ON period control input F/B lapses so that the main switch Q1 is turned off, the electromagnetic energy stored in the transformer T1 is supplied to an output through the output smoothing circuit 21. When all the electromagnetic energy stored in the transformer T1 is supplied, the electrical conduction of the diode D2 is lost, so that current of the secondary coil Ns becomes zero and the voltage induced in the control coil Nc of the transformer T1 is reversed from positive to negative, whereby the main switch Q1 is turned on by the control circuit 11. In the operation, an "on" period and an "off" period are short when the energy to be outputted is small, and a cycle thereof becomes long when the energy to be outputted is large.

Moreover, simultaneously with the series of switching operation, the timer circuit 12 is operated as described below. When the main switch Q1 is turned on, negative voltage proportional to input voltage is generated in the control coil Nc of the transformer T1, so that this voltage charges the capacitor C3 for timing to negative by current limited by the setting of the resistor R3 for timing setting and the constant voltage diode D1, and then when the main switch Q1 is turned off, the positive voltage proportional to output voltage is generated in the control coil Nc of the transformer T1, so that this voltage discharges the capacitor C3 for timing to positive by current limited by the resistor R3 for timing and the constant voltage diode D1, whereby triangular-wave-like voltage is generated between terminals of the capacitor C3 for timing (for example, a voltage waveform between the terminals of the capacitor C3 for timing in FIG. 2).

In the timer circuit 12 according to the present embodiment, timing is counted by charging the capacitor C3 for timing through the resistor R3 for setting and the constant voltage diode D1 based on the control coil voltage, but this is only an example, so that it is possible to realize it by generating voltage proportional to input voltage and output voltage and converting it into time, so as to form a timer.

If an oscillation cycle becomes long in a state where the energy to be outputted is large, since the capacitor C3 for timing is charged to positive during an "off" period of the main switch Q1, when the voltage between terminals of the capacitor C3 for timing reaches the ON state voltage of the switch Q2 thereby turning on the switch Q2, a trigger signal is outputted to the trigger input Z/C terminal of the control circuit 11 (for example, a waveform of voltage between the terminals of the capacitor C3 under heavy load in FIG. 2).

In addition, although the switch Q2 in this embodiment consists of a bipolar transistor, an FET (field-effect transistor), a comparator integrated circuit, or a logic integrated circuit may be used therefor.

Namely, in the present invention, an operation is performed by conventional frequency variable control in an operation range where output energy is low, that is, in a short cycle during which the energy stored in the transformer T1 is small. When the outputted energy is large and a cycle thereof is extended so as to be longer than the period set up in the timer circuit 12, without waiting for discharge of the electromagnetic energy of the transformer T1, a trigger input from the timer circuit has priority thereover, so as to turn on the main switch Q1.

In such an operation in which the trigger input from the timer circuit has priority thereover, in an "on" period of the main switch Q1 set up by the ON period control input F/B, negative voltage proportional to the input voltage is generated in the control coil Nc of the transformer T1. This voltage discharges C3 to positive by current limited by setting of the resistor R3 for timing setting and the constant voltage diode D1.

When the main switch Q1 is turned off, positive voltage proportional to the output voltage is generated in the control coil Nc of the transformer T1. This voltage discharges the capacitor C3 for timing to positive by current limited by the resistor R3 for timing setting and the constant voltage diode D1. When the voltage between terminals of the capacitor C3 for timing reaches the ON state voltage of the switch Q2 so that the switch Q2 is turned on, a trigger signal is outputted to the trigger input Z/C terminal of the control circuit 11, so that the main switch Q1 is turned on.

Figure 3:
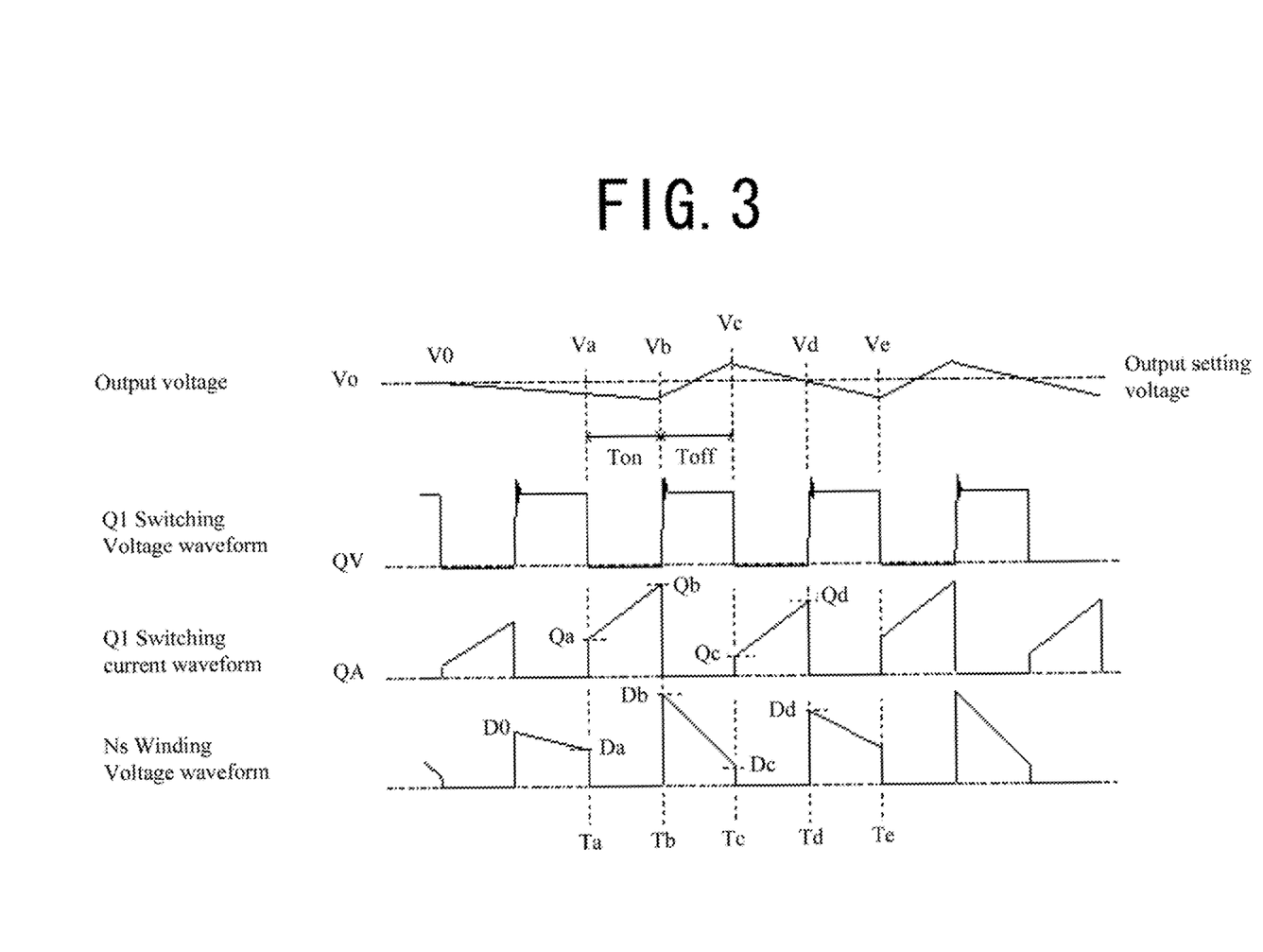
FIG. 3 is an explanatory diagram of an operation according to the present invention.

At this time, since the main switch Q1 is turned on before the transformer T1 completes discharge of electromagnetic energy to the output smoothing circuit 21, and the current of the main switch Q1 is positively biased when the main switch Q1 is turned on, accumulation in the transformer T1 is performed from the biased state (for example, a switching current waveform of the main switch Q1 under heavy load Td in FIG. 3).

In the operation where the trigger input of the timer circuit has priority, the current waveform with which the primary circuit is switched becomes a trapezoid waveform, and where a peak current value thereof is set to the same as that of the triangular current waveform in the flyback converter type frequency variable control, the electromagnetic energy stored in the transformer T1 increases, so that large energy can be supplied to the output smoothing circuit. That is, except for a temperature factor, the output energy can be increased, even if a switching element having the same maximum current and voltage rating, and a transformer having the same inductance value, number of coil turns, and core size, are used.

However, when control is carried out by the timer circuit, since the main switch Q1 is compulsorily turned on, a switching noise and switching loss increases by effects of rapidly changing discharge current of the resonance capacitor C1 and recovery current of the secondary rectifier diode D21.

Therefore, in the present invention, a load power is comparatively small especially in a steady state, and it is suitable for a load which requires large load power with a short pulse. It is possible to inexpensively obtain large electric power by performing the frequency variable control capable of soft switching until a steady load power period, and by performing the flyback converter type PWM control by the timer circuit during current surge time, such as large load power time based on a pulse, and an abnormal time etc. Furthermore, it is possible to offer a switching power source with small switching loss and low noise at the time of steady load power.

Furthermore, by timing one cycle from calculation of an "on" period and an "off" period of control coil voltage according to the present invention, and controlling an oscillation cycle, it is also possible to obtain a function of reducing overpower in the large power range.

For example, at time of the PWM control operation with the large power output, when input voltage is high, the negative high voltage proportional to input voltage is generated in the control coil of the transformer T1 during the "on" period of the main switch Q1. This voltage charges the capacitor C3 for timing to negative by current limited by the resistor R3 for timing setting and the constant voltage diode D1. When in the control coil of the transformer T1, the negative high voltage proportional to input voltage is generated, and since the negative voltage generated between the terminals of C3 becomes large, and the positive voltage proportional to the output voltage generated in the control coil of the transformer T1 does not change during a "off" period, it takes a longer time for the switch Q2 to reach an "on" voltage. Therefore, the time clocked by the timer circuit becomes long, so that the transformer T1 discharges much more electromagnetic energy to the output smoothing circuit 21, and when the main switch Q1 is turned on, the bias current due to the electromagnetic energy becomes small, so that since the current waveform of the main switch Q1 changes to approximately a triangular waveform from a trapezoid waveform, the peak current of the switch Q1 increases. Therefore, since the voltage generated in R1 tends to be larger when the input voltage is high, it becomes easy to perform an operation of the output power limitation by the current detector of the control circuit 11.

In case of an overcurrent protection by a source current detection of the switch Q1 in general PWM control, although an output power value, at which overcurrent protection is operated, increases, as the input voltage becomes high, according to the present invention, the increase of the electric power value of the overcurrent protection depending on the input can be reduced.

Moreover, during the "on" period of the main switch Q1, the negative voltage proportional to input voltage is generated in the control coil of the transformer T1. This voltage charges the capacitor C3 for timing to negative by current limited by setting of the resistor R3 for timing setting and the constant voltage diode D1.

During an "off" period of the main switch Q1, the positive voltage proportional to output voltage is generated in the control coil of the transformer T1. This voltage discharges the capacitor C3 for timing to positive by current limited by the resistor R3 for timing setting and the constant voltage diode D1.

When the voltage between the terminals of the capacitor C3 for timing reaches the ON voltage of the switch Q2 so that the switch Q2 is turned on, a trigger signal is inputted to the terminal of the trigger input Z/C of the control circuit 11 so that the main switch Q1 is turned on, whereby a current waveform is formed so as to be a trapezoid waveform so that it is possible to increase output energy. However, when the output drops by a current restriction circuit of the primary circuit at abnormal time due to an output overload, since the voltage proportional to the output voltage is generated at the control coil output at an "off" period, the control coil voltage drops at the same time in proportion to the output, whereby charging of the capacitor C3 for timing becomes slow. Therefore, time until the switch Q2 is turned on, is prolonged, so that an "off" period is extended, whereby an oscillation cycle is extended and the output energy drops, and moreover the output drops due to overload, and finally, due to the drop of the control coil output at an "off" period, the switch Q2 cannot always be turned on, as in the conventional frequency variable control, and the output energy is limited, whereby the safety at time of an output overload is secured.

Figure 4:
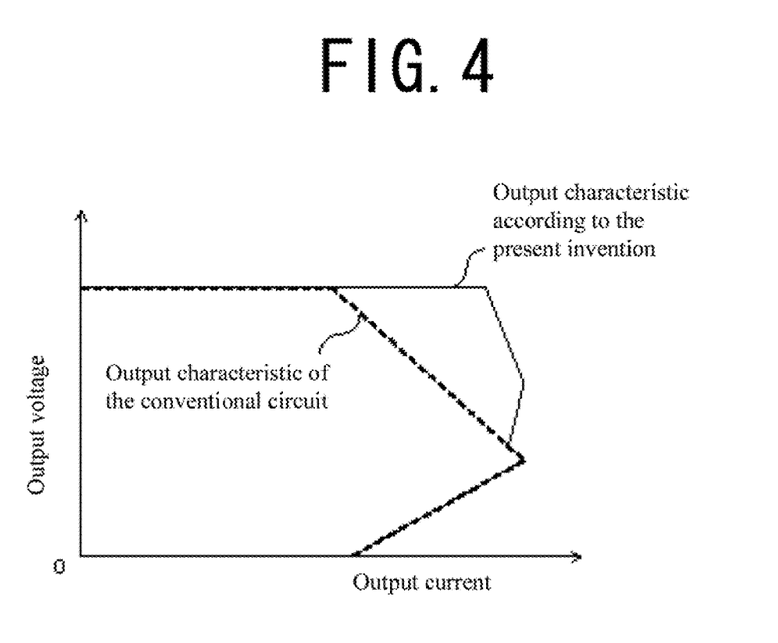
FIG. 4 shows an output characteristic curve of an embodiment of the circuit of FIG. 1.

For example, FIG. 4 shows an example of an output characteristic according to the present invention for comparison, wherein a vertical axis is output voltage, and a horizontal axis is output current, and wherein the output characteristic of a power source according to the conventional flyback converter type frequency variable control (shown in a broken line in FIG. 4) is compared with that of a power source according to the present invention (shown in a solid line in FIG. 4), in which a main switching element and a transformer thereof are the same as those used in the power source according to the conventional flyback converter type frequency variable control. In the present invention, larger electric power is obtained, compared with the conventional power supply, and as the output voltage drops due to overcurrent, the output power also drops, thus becoming an overcurrent characteristic in the conventional frequency variable control.

According to the present invention, in a range of the flyback converter type PWM control which is operated by the timer circuit 12, it can be controlled in a stable oscillation state.

For example, in the explanatory diagram of an operation shown in FIG. 3, when a load changes in a state where the frequency is merely fixed, i.e. in a state where the sum (Ton+Toff) of an "on" period and an "off" period is constant, even if the output current changes, the "on" period Ton of the main switch Q1 is constant, and does not have almost no relation to feedback control during the "on" period Ton.

When the output voltage Vo drops due to an increase in the output current, since an L value of the secondary coil is constant, due to the voltage drop, the discharge current of output winding of the secondary coil Ns gently decreases, so that in a state where more residual energy is stored in the transformer T1, that is, while current at a point Da of FIG. 3 is larger in case it is shown by output coil current, the main switch Q1 is turned on when an on-trigger set up as a fixed cycle is inputted, and since current Qa increases at a leading edge of the following ON cycle of the main switch Q1, in this cycle, the energy stored in the transformer increases, and power supplied to the secondary smoothing circuit increases, whereby the output voltage Vo is kept constant.

However, when the supplied voltage is excessive in this operation, the output goes up to a point Vc of FIG. 3, in which the inclination of the discharge current becomes steep due to an increase of the output voltage Vo since the L value and the "off" period Toff of the secondary coil are constant, and the energy stored in the transformer T1 can be easily discharged, so that the amount of residual energy in the transformer T1 is small, that is, the output coil current is at a point Dc, and then the main switch Q1 is turned on when an on-trigger set up as a fixed cycle is inputted, whereby the current decreases at a leading edge of the following ON cycle of the main switch Q1 as that in a point Qc, and the energy stored in a transformer decreases. Therefore, the output voltage Vo decreases because the voltage supplied to the secondary side smoothing circuit decreases. When the output voltage Vo excessively drops as shown as a point Ve of FIG. 3, the above operation is repeated, and when the operation does not end, an unstable oscillation continues.

Moreover, when the repeated cycle is in a range of a frequency where the output stabilization by feedback is difficult, and when the above-described endless state continues, the oscillation sound is generated from the transformer T1 in case where voltage ripple of the output increases, or in case of an auditory oscillation cycle.

However, in the present invention, since the cycle is not perfectly fixed but each oscillation cycle is controlled by a signal from the control coil, it is possible to realize a stabile oscillation without requiring any special compensation circuit for performing compensation every oscillation cycle, in addition to the feedback circuit.

In the case of the present invention, at the same time the voltage of the output capacitor C4 decreases by the increase of the output current, the positive voltage proportional to the output voltage which is generated in the control coil at the "off" period of the main switch Q1 decreases, so that the capacitor C3 for timing is gently charged, and an "off" period is extended. Since much energy is discharged by the output circuit due to the extension of the "off" period, the electromagnetic energy stored in the transformer decreases, and by suppressing an increase in current at time of a leading edge next time the main switch Q1 is turned on, the electromagnetic energy stored in the transformer during this "on" period is reduced, and rapidly increasing supply thereof to the output is suppressed.

Moreover, even at time of increase in voltage of the output capacitor C4, when the positive voltage proportional to the output voltage generated in the control coil increases during an "off" period of the main switch Q1, the charging current of the capacitor C3 for timing increases, so that the "off" period becomes short. Since this "off" period becomes short, discharge of the electromagnetic energy to the output circuit is suppressed so that rapid reduction of the residual energy in the transformer T1 is suppressed, thereby controlling so as not to decrease the residual energy in transition when the main switch Q1 is turned on. By the above operation, it is possible to suppress a transitional operation to a load change and to offer a stable operation.

According to the present invention, by reducing loss of a switching element, a coil, and an output smoothing circuit, which is a drawback in the frequency variable control of the conventional flyback converter type switching power source, it is possible to offer, at low cost, a flyback converter type switching power source which can supply large electric power.

Moreover, it is possible to reduce a discharge noise in a specific frequency which is a drawback of the PWM control of the conventional flyback converter type switching power source, and furthermore, to perform soft switching in which resonance is used. Moreover, an increase in switching loss, such as rapidly increasing current due to electric discharge of a damper capacitor, or short-circuit current due to recovery current of a secondary rectifier diode etc. and a generation of the high frequency noise due to rapid switching can also be reduced, so that it is possible to make industrial application.

The invention claimed is:

1. A power source apparatus in which input voltage is applied to a primary coil of a transformer, and switching drive of the input voltage is carried out by a switching element, so that direct-current electric power is outputted from a secondary coil of the transformer through a rectifier circuit comprising:

a trigger-control circuit which detects direct-current output voltage so as to control an "on" period, which detects that current of the secondary coil becomes zero based on a zero detection signal obtained from a voltage signal from a control coil that the transformer has, and which turns on the switching element; and a timer circuit which is operated according to the voltage signal of the control coil for timing, and which gives an ON signal to the trigger-control circuit according to a timing signal obtained by timing so as to perform control whereby when outputted energy is large and a cycle thereof is extended so as to be longer than a period set up in the timer circuit, without waiting for discharge of electromagnetic energy of the transformer, the ON signal has priority over the zero voltage signal, so as to turn on the main switch in a coercive manner, wherein a capacitor for timing, which forms the timer circuit is charged to negative by a negative voltage level which is proportional to the input voltage generated in the "on" period of the switching element according to the voltage signal from the control coil, and the capacitor for timing is charged to positive according to positive voltage level proportional to the output voltage generated in the control coil in a "off" period, whereby one cycle is timed by calculation of the "on" period and the "off" period of the control coil voltage, so as to control oscillation cycle.

2. The power source apparatus according to claim 1, wherein one end of the control coil is connected with a resistor for timing setup, and is connected with a base terminal of a switch device provided in timer circuit, through the resistor for timing setting and a constant voltage diode, and the capacitor for timing is in parallel connected with the base terminal and an emitter terminal of the switch device, and a collector terminal of the switch device is connected to a trigger input terminal of the trigger-control circuit, and one end of the capacitor for timing is connected with the other end of the control coil.

\* \* \* \* \*